(12) United States Patent
Borodin et al.

(10) Patent No.: US 11,537,219 B2
(45) Date of Patent: Dec. 27, 2022

(54) FEEDBACK INPUT APPARATUS AND METHOD FOR USE THEREOF

(71) Applicant: The Research Foundation for The State University of New York, Albany, NY (US)

(72) Inventors: Anatoliy Borodin, Setauket, NY (US); Yevgen Borodin, Port Jeff Station, NY (US); Andrii Soviak, Lake Grove, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days.

(21) Appl. No.: 17/265,296

(22) PCT Filed: Aug. 7, 2019

(86) PCT No.: PCT/US2019/045395
§ 371 (c)(1),
(2) Date: Feb. 2, 2021

(87) PCT Pub. No.: WO2020/033468
PCT Pub. Date: Feb. 13, 2020

(65) Prior Publication Data
US 2021/0357042 A1  Nov. 18, 2021

Related U.S. Application Data

(60) Provisional application No. 62/715,517, filed on Aug. 7, 2018.

(51) Int. Cl.
*G06F 3/0354* (2013.01)
*G06F 3/01* (2006.01)

(52) U.S. Cl.
CPC .......... *G06F 3/03543* (2013.01); *G06F 3/016* (2013.01); *G06F 2203/0333* (2013.01)

(58) Field of Classification Search
CPC ................. G06F 3/03543; G06F 3/016; G06F 2203/0333
See application file for complete search history.

(56) References Cited

U.S. PATENT DOCUMENTS

| 4,862,165 A | 8/1989 | Gart |
| 5,340,067 A * | 8/1994 | Martin .................... G06F 3/039 248/118.5 |

(Continued)

FOREIGN PATENT DOCUMENTS

| CA | 2298407 | 11/2000 |
| CN | 1853156 | 10/2006 |

(Continued)

OTHER PUBLICATIONS

PCT/ISA/237 Written Opinion issued on PCT/US2019/045395, dated Aug. 7, 2019, pp. 7.

(Continued)

*Primary Examiner* — Ariel A Balaoing
(74) *Attorney, Agent, or Firm* — The Farrell Law Firm, P.C.; John F. Gallagher, III

(57) ABSTRACT

Provided are a computer mouse and a method for operating the computer mouse, with the computer mouse including a palm-rest on a first side thereof, a baseplate on a second side substantially opposite the first side, hinges positioned along an edge of the palm-rest, and finger-rests, with each finger-rest fixedly attached to one end of a respective hinge.

20 Claims, 9 Drawing Sheets

(56) References Cited

U.S. PATENT DOCUMENTS

| | | | |
|---|---|---|---|
| 5,441,494 A | 8/1995 | Ortiz | |
| 5,726,683 A | 3/1998 | Goldstein et al. | |
| 5,796,354 A * | 8/1998 | Cartabiano | G06F 3/014 345/157 |
| 5,894,302 A * | 4/1999 | Scenna | G06F 3/03543 345/163 |
| 5,912,660 A | 6/1999 | Gouzman et al. | |
| 5,949,406 A | 9/1999 | Kress | |
| 6,005,553 A | 12/1999 | Goldstein et al. | |
| 6,031,518 A | 2/2000 | Adams et al. | |
| 6,031,523 A | 2/2000 | Bunke et al. | |
| 6,064,371 A | 5/2000 | Bunke et al. | |
| 6,266,047 B1 | 7/2001 | Benja-Athon | |
| 6,417,842 B1 * | 7/2002 | Shattuck | G06F 3/03543 345/163 |
| 6,431,504 B1 | 8/2002 | Ignagni | |
| 6,480,184 B1 * | 11/2002 | Price | G06F 3/03543 345/157 |
| 6,556,150 B1 | 4/2003 | McLoone et al. | |
| 6,590,564 B1 | 7/2003 | McLoone et al. | |
| 6,664,954 B1 | 12/2003 | Yashimura et al. | |
| 6,717,569 B1 * | 4/2004 | Gruhl | G06F 3/03543 345/157 |
| 6,762,749 B1 * | 7/2004 | Gouzman | G06F 3/03544 434/114 |
| 6,847,352 B2 | 1/2005 | Lantigua | |
| 6,924,787 B2 | 8/2005 | Kramer et al. | |
| 7,151,525 B2 | 12/2006 | McAlindon | |
| 7,952,498 B2 | 5/2011 | Higa | |
| 8,665,216 B2 | 3/2014 | Karasin et al. | |
| 9,104,271 B1 | 8/2015 | Adams et al. | |
| 10,001,836 B2 | 6/2018 | Huang | |
| 10,856,590 B2 | 12/2020 | Anunike | |
| 11,249,556 B1 | 2/2022 | Schwarz et al. | |
| 2001/0050673 A1 | 12/2001 | Davenport | |
| 2002/0021277 A1 * | 2/2002 | Kramer | G06F 3/016 345/156 |
| 2002/0140668 A1 | 10/2002 | Crawford | |
| 2003/0197680 A1 | 10/2003 | Davenport | |
| 2003/0230680 A1 | 12/2003 | Doan | |
| 2005/0179644 A1 | 8/2005 | Alsio et al. | |
| 2005/0275621 A1 * | 12/2005 | Saez | G06F 3/03543 345/156 |
| 2006/0274044 A1 * | 12/2006 | Gikandi | G06F 3/03543 345/163 |
| 2008/0129693 A1 | 6/2008 | Chen et al. | |
| 2008/0129694 A1 * | 6/2008 | Haven | G06F 3/014 345/158 |
| 2008/0259028 A1 * | 10/2008 | Teepell | G06F 3/014 345/158 |
| 2009/0213068 A1 | 8/2009 | Saez et al. | |
| 2009/0247819 A1 | 10/2009 | Wilson et al. | |
| 2009/0289896 A1 * | 11/2009 | Jacob | G06F 1/1626 345/158 |
| 2010/0045600 A1 * | 2/2010 | Pilkington | G06F 3/0383 345/161 |
| 2012/0095298 A1 | 4/2012 | Stefanchik et al. | |
| 2013/0329011 A1 | 12/2013 | Lee et al. | |
| 2014/0098043 A1 | 4/2014 | Grant | |
| 2014/0313022 A1 * | 10/2014 | Moeller | G06F 3/03547 340/407.1 |
| 2015/0054746 A1 | 2/2015 | O'Conaire et al. | |
| 2017/0192536 A1 | 7/2017 | Wang et al. | |
| 2018/0185104 A1 | 7/2018 | Olson et al. | |
| 2018/0284896 A1 * | 10/2018 | Kearney | G06F 3/014 |
| 2019/0155411 A1 | 5/2019 | Kinrot et al. | |
| 2019/0167370 A1 | 6/2019 | Olson | |
| 2019/0220107 A1 * | 7/2019 | Odgers | G06F 3/0304 |
| 2020/0390510 A1 | 12/2020 | Thompson et al. | |
| 2021/0008410 A1 | 1/2021 | Athanasiou et al. | |
| 2021/0022899 A1 | 1/2021 | Anunike | |
| 2021/0110591 A1 | 4/2021 | Yokokawa | |
| 2022/0048200 A1 | 2/2022 | Varley et al. | |

FOREIGN PATENT DOCUMENTS

| | | |
|---|---|---|
| CN | 103150042 | 6/2013 |
| CN | 101952791 | 9/2013 |
| CN | 107368183 | 11/2017 |
| CN | 107756425 | 3/2018 |
| CN | 112041795 | 12/2020 |
| CN | 112689483 | 4/2021 |
| CN | 112804958 | 5/2021 |
| CN | 113795214 | 12/2021 |
| CN | 114727825 | 7/2022 |
| CN | 114730220 | 7/2022 |
| DE | 10128192 | 7/2002 |
| DE | 102004035143 | 2/2006 |
| DE | 202019103171 | 9/2019 |
| DE | 202016008877 | 5/2020 |
| EP | 0901094 | 3/1999 |
| EP | 1159706 | 8/2000 |
| EP | 1063609 | 12/2000 |
| JP | 2004500611 | 1/2004 |
| JP | 2006/515700 | 6/2006 |
| JP | 2006526845 | 11/2006 |
| JP | 3933848 | 6/2007 |
| JP | 4671469 | 4/2011 |
| JP | 2014522018 | 8/2014 |
| JP | 2018512643 | 5/2018 |
| JP | 2018531063 | 10/2018 |
| JP | 2018536933 | 12/2018 |
| JP | 2019528123 | 10/2019 |
| JP | 6943550 | 10/2021 |
| KR | 100595925 | 7/2006 |
| KR | 1020070114143 | 11/2007 |
| KR | 20090076180 | 7/2009 |
| KR | 20170063498 | 6/2017 |
| KR | 20170081727 | 7/2017 |
| WO | WO 2000060536 | 10/2000 |
| WO | WO 2001069361 | 9/2001 |
| WO | WO 2004003835 | 1/2004 |
| WO | WO 2004025447 | 3/2004 |
| WO | WO 2009060434 | 5/2009 |
| WO | WO 2013104060 | 7/2013 |
| WO | WO 2015095459 | 6/2015 |
| WO | WO 2016111134 | 7/2016 |
| WO | WO 2016116810 | 7/2016 |
| WO | WO 2016182421 | 11/2016 |
| WO | WO2017222397 | 12/2017 |
| WO | WO 2018068233 | 4/2018 |
| WO | WO 2020065265 | 4/2020 |
| WO | WO 2020065266 | 4/2020 |
| WO | WO 2021158367 | 8/2021 |
| WO | WO 2022039832 | 2/2022 |

OTHER PUBLICATIONS

PCT/ISA/210 Search Report issued on PCT/US2019/045395, dated Aug. 7, 2019, pp. 4.

Sheriff, R.E. Ergonomics—That Mouse Can Bite You!! https://www.atlenv.com/ergonomics-that-mouse-can-bite-you/, 3 pp, (2016).

Metec. Modul P20.: http://web.metec-ag.de/P20.pdf, 3pp (Oct. 20, 2013).

ROHM_Co_Ltd. Datasheet "Infrared Light Emitting Diode, Side-View Type SIM-22ST": . . . http://rohmfs.rohm.com/en/products/databook/datasheet/opto/optical__sensor/infrared__led/sim-22st.pdf; 5 pp, (2010).

Völkel, Thorsten et al., "Tactile Graphics Revised: The Novel BrailleDis 9000 Pin-Matrix Device with Multitouch Input", K. Miesenberger et al. (Eds.): ICCHP 2008, LNCS 5105, pp. 835-842, 2008. © Springer-Verlag Berlin Heidelberg 2008.

ROHM_Co_Ltd. Datasheet "Infrared Light Emitting Diode, Side-View Type SIM-22ST":, 2005 http://rohmfs.rohm.com/en/products/databook/datasheet/opto/optical_sensor/infrared_led/sim-22st.pdf; 5 pp, 2010.

* cited by examiner

FEEDBACK INPUT APPARATUS AND METHOD FOR USE THEREOF

PRIORITY

This application claims the benefit of U.S. Provisional Application No. 62/715,517 filed with the U.S. Patent and Trademark Office on Aug. 7, 2018, the entire contents of which is incorporated herein by reference.

GOVERNMENT SUPPORT STATEMENT

This invention was made with government support under 901F0117-02-00 awarded by the Administration for Community Living. The government has certain rights in the invention.

BACKGROUND

1. Field

The present disclosure relates generally to methods and devices for user input, more particularly to methods and devices to expedite user input and navigation of a computer screen by haptic feedback.

2. Related Art

A conventional computer input apparatus, e.g., a mouse, includes a curved palm-rest with several extended selection push-buttons and at least one motion sensor for detecting movement of the mouse. As known in the art, a cursor displayed on a computer screen will move a distance corresponding to the detected movement of the mouse.

To operate the mouse, a user will place his/her palm on a palm-rest and will place at least one fingertip on a respective push-button thereof. A downward pushing using the fingertips results in a selection action, and a user will move the mouse by exerting a pushing on the palm-rest. However, pushing on the palm-rest to move the mouse, as necessary for navigation, results in a downward movement of the user's wrist. Also, a distal phalanx of the at least one user finger will lay flat on the respective push-button with their palm covering the palm-rest, resulting in a part of the palm closest to the wrist being unsupported. Accordingly, conventional devices may cause carpal tunnel syndrome.

A variety of different palm-rest shapes and accessories have been designed in an effort to improve ergonomics. However, these improvements typically result in a larger sized or bulkier mouse, which typically decrease accuracy, and may still require pushing on the palm-rest for a cursor to navigate to a desired location of a displayed graphic user interface (GUI).

In addition to the above, conventional input devices typically fail to adequately address the needs of visually impaired users, and the growing complexity of computer interfaces limits the usefulness of conventional assistive technologies, resulting in visually impaired users spending excessive time performing simple tasks online or precluding full interaction with information output on a computer display. Conventional systems to address these shortcoming include screen readers, haptic displays, haptic gloves and haptic mice.

Haptic displays, gloves and mice provide a tactile panel with one or more raised surfaces that provide tactile information to the user. See, e.g., U.S. Pat. No. 7,952,498 to Higa, U.S. Pat. No. 9,104,271 to Adams et al., and U.S. Pat. No. 5,912,660 to Gouzman et al. Such haptic technology includes pin-matrix devices, e.g., the BrailleDis 9000 Pin-Matrix Device described by Thorsten Volkel, et al., *Tactile Graphics Revised: The Novel BrailleDis 9000 Pin-Matrix Device with Multitouch Input*, ICCHP 2008, LNCS 370a-d 5, pp. 835-836 (2008). Conventional pin-matrix devices raise mechanical pins to form a tactile picture on matrixes of up to 60×120 pins. However, such conventional displays are bulky, expensive and low resolution. Also, such conventional displays allow the user to receive feedback only of a small percentage of haptic elements that are located directly under the user's fingers, thereby rendering useless the other haptic elements and significantly reducing efficiency.

A conventional haptic mouse is unable to provide haptic of more than a limited tactile feedback, and does not provide a user with feedback of content on an entire GUI unless the user first moves the tactile mouse across each different part of the GUI. Of course, the multiple shifts required to move the tactile mouse across each different part of the GUI may result in an overload of information that is not accessible with directional feedback.

Even a highly skilled visually-impaired user who is familiar with geometrical and/or spatial organization of GUI elements being displayed on a screen likely will not be able to demonstrate effective spatial navigation with the tactile mouse, at least because the computer mouse does not move on a straight line between GUI elements. In addition, the user is compelled to deviate to the left and to the right from a trajectory leading to a target GUI element, to verify whether the user has missed a target GUI element. The extent of such deviation progressively increases with the distance to the GUI element, resulting is visually impaired user needing an increased amount of time to navigate to the target GUI element.

Further, selection of a desired GUI element requires that a user push an interactive button associated with or located on a haptic module, which requires that the user remove at least one finger from the haptic display. Removing the at least one finger from the haptic display may result in user uncertainty as to whether anything on the haptic display changed or not. If the information on the haptic display has changed during the time that the user pushes the button, an undesired GUI element may be selected.

Accordingly, conventional devices and systems to assist visually impaired users result in inefficient 2-D screen exploration and potentially inaccurate selection of an undesired GUI element.

SUMMARY

To overcome shortcomings of conventional methods, components and systems, provided herein are a feedback input apparatus and method for use thereof that provide the advantages described herein.

An aspect of the present disclosure provides a housing for a computer mouse, with the housing including a palm-rest on a first side of the housing, a baseplate on a second side substantially opposite the first side, a peripheral finger-rest fixedly attached to the baseplate, a distal portion extending from the peripheral finger-rest, and a plurality of spherically shaped recesses provided on the distal portion.

An aspect of the present disclosure provides a housing for a computer mouse, the housing including a palm-rest on a side of the housing, a mechanical joint attached at a first end thereof to the palm-rest, a finger-rest attached to a second end of the mechanical joint opposite the first end to movably connect to the palm-rest, and a position sensor provided on the finger-rest that detects an input from a user, without moving the palm-rest.

An aspect of the present disclosure provides a computer mouse that includes a palm-rest on a first side of the computer mouse, a baseplate on a second side substantially opposite the first side, a plurality of mechanical joints with an end of each mechanical joint attached along an edge of at least one of the palm-rest and the baseplate, and a plurality of finger-rests with a proximal end of each finger-rest being movably connected to the edge by attaching to another end of a respective mechanical joint.

An aspect of the present disclosure provides a navigation method that includes controlling, by at least one processor, output of a graphic user interface (GUI) comprising a plurality of pixels; mapping pixels of the plurality of pixels; detecting positions of each distal end of each indicator of a plurality of indicators of a remote input device in communication with the at least one processor; identifying at least one pixel of the GUI as corresponding to each position of the detected positions; determining a first at least one characteristic of each identified at least one pixel of the GUI; providing a first feedback in response to the determined first at least one characteristic of each identified at least one pixel; detecting movement of at least one distal end of at least one indicator; determining a second at least one characteristic of at least one pixel corresponding to a position of the moved at least one distal end of at least one indicator; and in response to the second at least one characteristic being different from the first at least one characteristic, providing a second feedback to the remote input device corresponding to the moved at least one distal end.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION

The following detailed description of certain embodiments references the accompanying drawings. In the description, explanation about related functions or constructions known in the art are omitted for clarity.

An embodiment of the present disclosure provides a mouse with supporting finger-rests, in addition to support for a user's palm.

Figure 1:
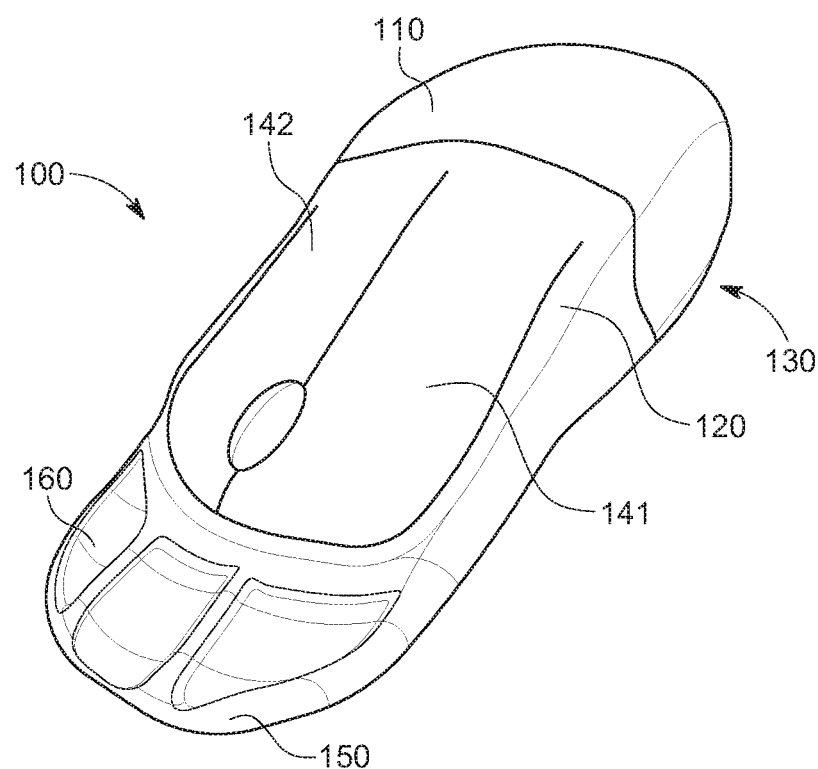
FIG. 1 is a perspective view of an exemplary embodiment of an ergonomic mouse in accordance with an embodiment of the present disclosure.
Figure 2:
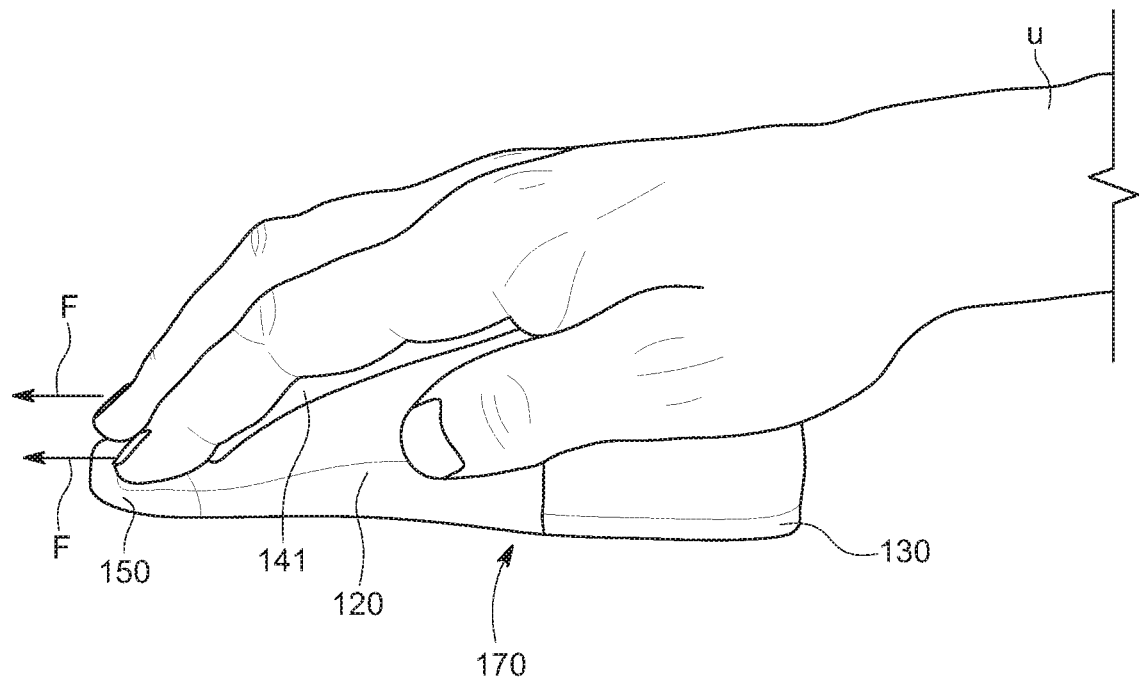
FIG. 2 is a side view of the ergonomic mouse of FIG. 1.

FIG. 1 is a perspective view of an exemplary embodiment of an ergonomic mouse 100 in accordance with an embodiment of the present disclosure. FIG. 2 is a side view of the ergonomic mouse of FIG. 1.

As illustrated in FIGS. 1 and 2, the mouse 100 includes a palm-rest 110 and a baseplate 130 on upper and under sides thereof, respectively. A trackball 170 is provided on the underside to detect movement of the mouse, as known in the art.

The mouse 100 includes a peripheral finger-rest 120, push-buttons 141, 142, and a distal portion 150. The peripheral finger-rest 120 is fixedly attached to the baseplate 130, and the distal portion 150 extends from the finger-rest 120.

As shown in FIG. 1, the distal portion 150 includes a plurality of spherically shaped recesses 160 configured to accommodate a distal phalanx, i.e., fingertip, of each respective finger of a user U.

FIG. 2 illustrates use of the mouse 100 in a navigation mode.

As shown in FIG. 2, navigation using the mouse 100 is performed by the user placing his/her palm on the palm-rest 110 and exerting a horizontal pushing force F via respective fingertips that are positioned at respective recesses 160 in a desired horizontal direction. Exerting the pushing force F via the respective fingertips substantially reduces the need to push on the palm-rest 110 and reduces the need to prop the user's forearm on a table or supporting surface, which will reduce bending of the wrist and reduce likelihood of developing carpal tunnel syndrome.

When navigating, as illustrated in FIG. 2, the user's fingers are aligned with conventional selection push-buttons 141, 142. That is, when the user's fingertips are positioned in respective recesses 160, middle phalanges of the fingers are aligned with respective conventional selection push-buttons 141, 142. Although respective middle phalanges of the fingers do not substantially touch or exert sufficient force to depress the respective selection push buttons 141, 142, the alignment allows the user to quickly adjust fingertip position or the grip to vertically depress, i.e., push, one or more of the selection push buttons 141, 142, as desired, thereby enabling rapid transfer from a navigation mode to a selection mode.

As illustrated, mouse 100 provides sufficient support for the palm and fingers, without the user needing additional support to avoid bending of the user's wrist. Also, the user may hold the mouse 100 with the thumb and little finger. When in the navigation mode, the user may exert a force F via one or more operating fingers, i.e., index, middle and ring fingers, to propel the mouse 100. Simultaneous use of the thumb and the little finger supports the mouse 100 from three sides, thereby providing a triangular support sufficient to work with computer applications requiring high mouse stability.

Figure 3:
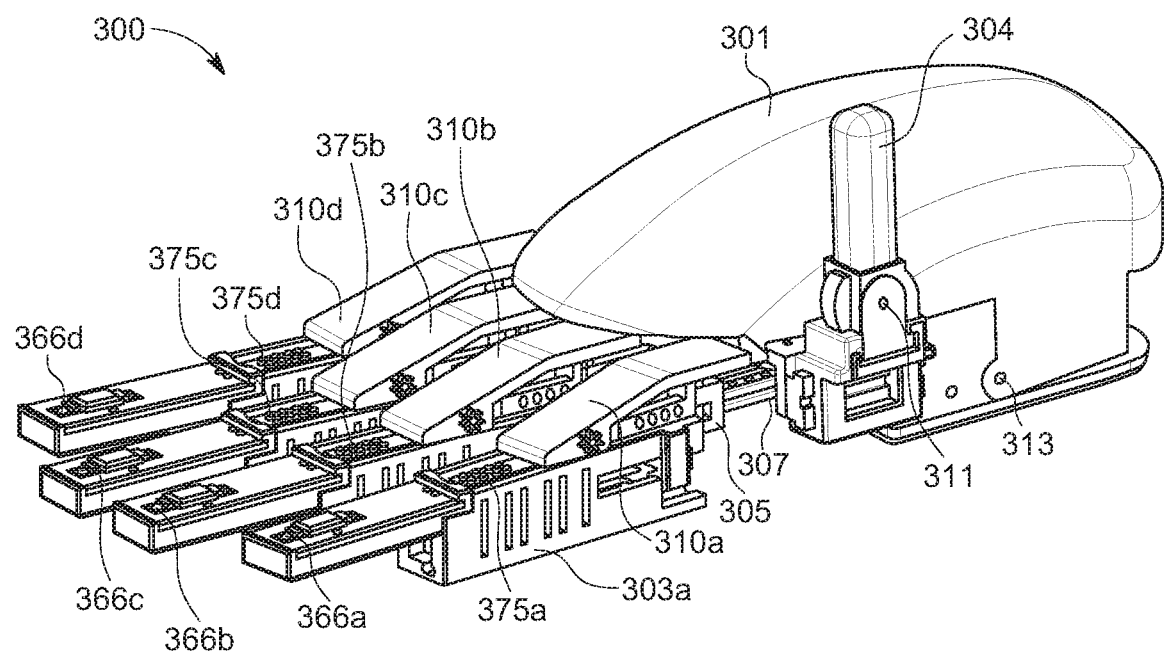
FIG. 3 is a perspective view of a mouse in accordance with an embodiment of the present disclosure.
Figure 4:
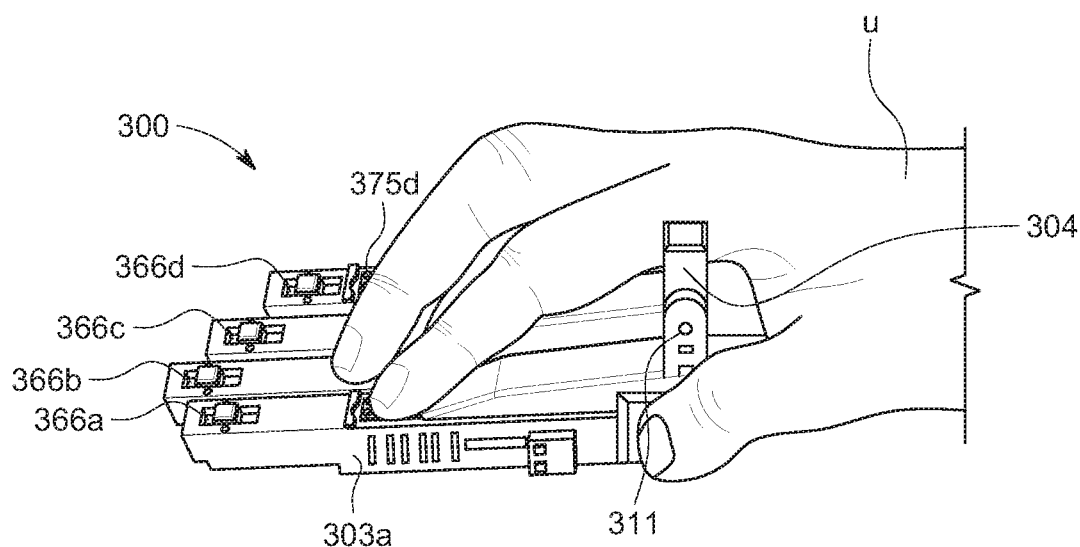
FIG. 4 illustrates the mouse of FIG. 3 in use by a user.
Figure 5:
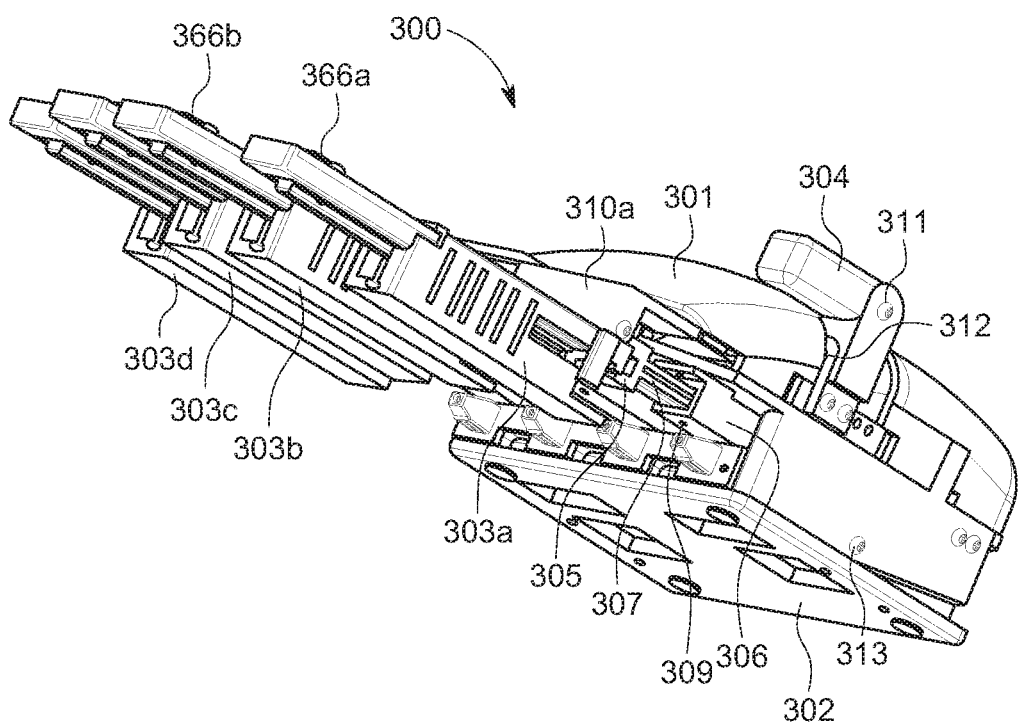
FIG. 5 is another perspective view of the mouse of FIG. 3.

FIG. 3 is a perspective view of a mouse 300 in accordance with an embodiment of the present disclosure. FIG. 4 illustrates the mouse 300 of FIG. 3 in use by a user. FIG. 5 is another perspective view of the mouse of FIG. 3.

As shown in FIG. 3-5, the mouse 300 includes a palm-rest 301, a baseplate 302, a plurality of finger-rests 303a-d, and a stick 304. As illustrated in FIG. 4, when the mouse 300 is in use, the stick 304 is configured to be held between a user's index finger and the thumb. FIG. 3 illustrates stick 304 in a substantially vertical orientation, in a standby state, with a distal end of the stick 304 configured to move in a longitudinal direction about a horizontal axis around mechanical joint 311.

Adjustable inclined recesses 310a-d provide users with comfortable access to respective haptic elements 375a-d. Users may uncover an interactive button built in the respective haptic element 375 by moving a respective inclined recess of one or more of a plurality of recesses 310a-d toward the palm-rest 301. Uncovering the interactive button allows selection, by depressing the interactive button, of a corresponding command of a GUI being navigated by the mouse 300. When the interactive buttons are covered, the user may select GUI commands by operating the stick 304, pushing down the back of the palm-rest 301 (FIG. 3), or one or more of buttons 320a and 320b (FIG. 6).

FIG. 5 shows details of the bottom of the mouse 300, including the baseplate 302 and the absence of a conventional trackball or similar mechanical position sensor or position identifier, and/or conventional optical position identifier. FIG. 5 illustrates stick 304 in a horizontal orientation, in an operation state. FIG. 6 illustrates stick 304 moved to a slightly horizontal orientation, in response to user manipulation during operation of same. The palm-rest 301 provides slidable adjustment in a longitudinal direction using joint 313 (in FIG. 5), which is configured to slide along the baseplate 302 and to swing the palm-rest 301 around a horizontal axis with respect to the baseplate 302.

Figure 6:
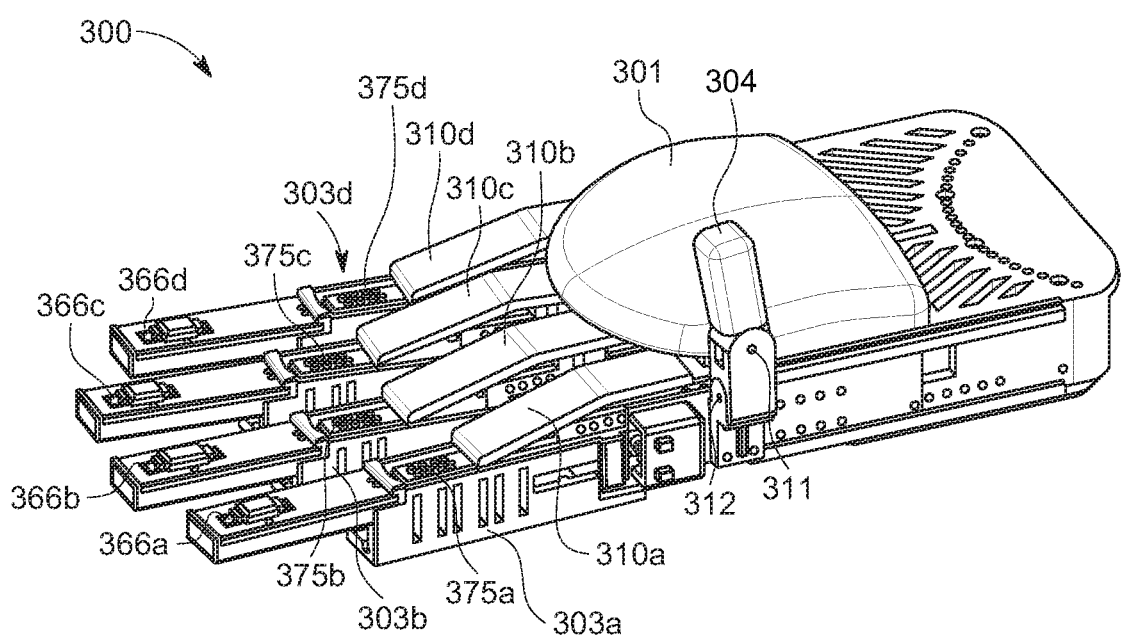
FIG. 6 is a perspective view of a mouse with a shorter palm-rest in accordance with an embodiment of the present disclosure.

FIG. 6 is a perspective view of a mouse 300 with a shortened palm-rest 301, in accordance with an embodiment of the present disclosure. The shortened palm-rest 301 is obtained by slidable adjustment in a longitudinal direction using guiding rails 314a, 314b (FIG. 13) located on an inside surface of the palm-rest 301.

As illustrated in FIG. 6, mechanical joints 311 and 312 allow a user to fold and/or swing the stick 304 in a plurality of three-dimensional tilt positions, i.e., in longitudinal and transverse directions, allowing the user to input a varied number of different inputs when in the operation state. User tilting of the stick 304 relative to the palm-rest 301 provides selection options, in addition to or instead of depressing the interactive buttons. When the user moves the stick 304 in the operation state, the direction, degree and rate of movement of the stick 304 corresponds to a desired user input.

Figure 7:
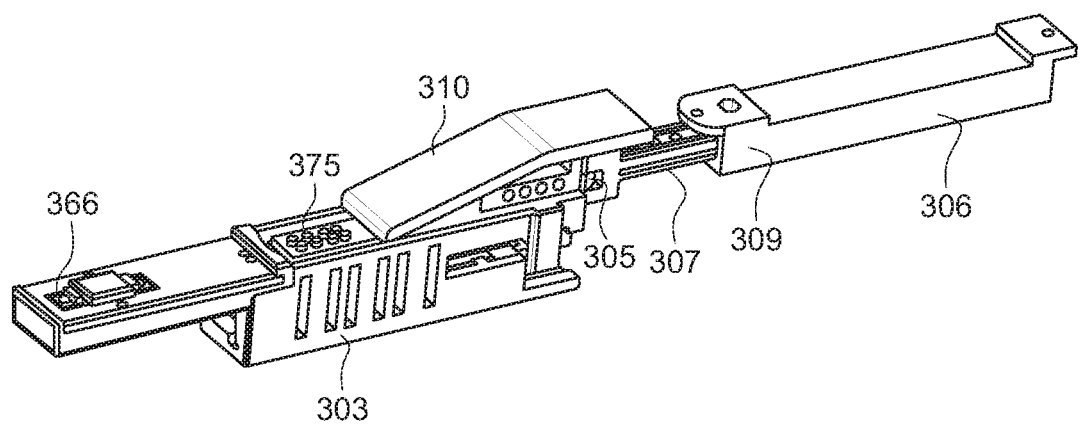
FIG. 7 is a perspective view of a finger-rest in accordance with an embodiment of the present disclosure.
Figure 8:
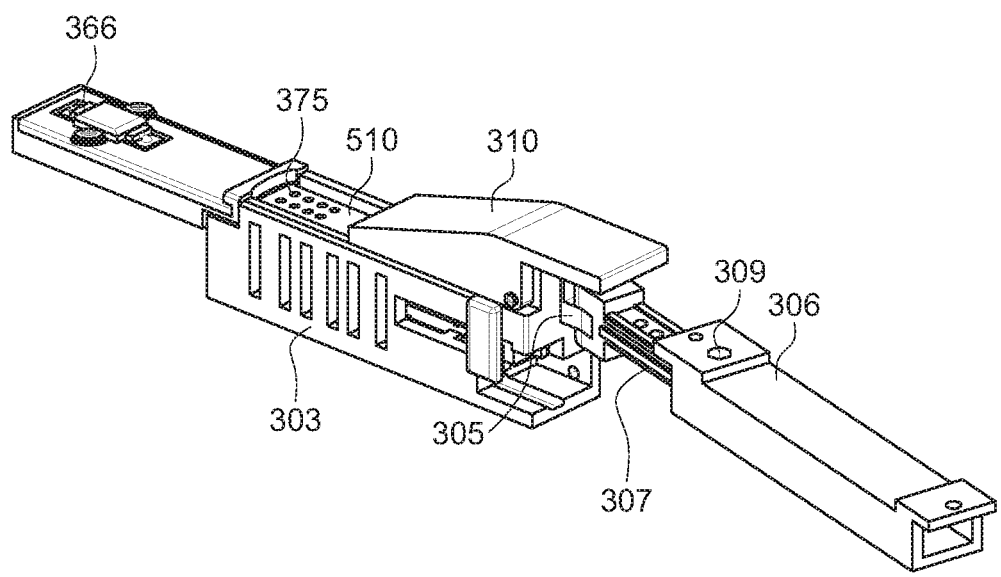
FIG. 8 is a perspective view of the finger-rest of FIG. 7, with a mechanical joint in a flexed orientation.
Figure 9:
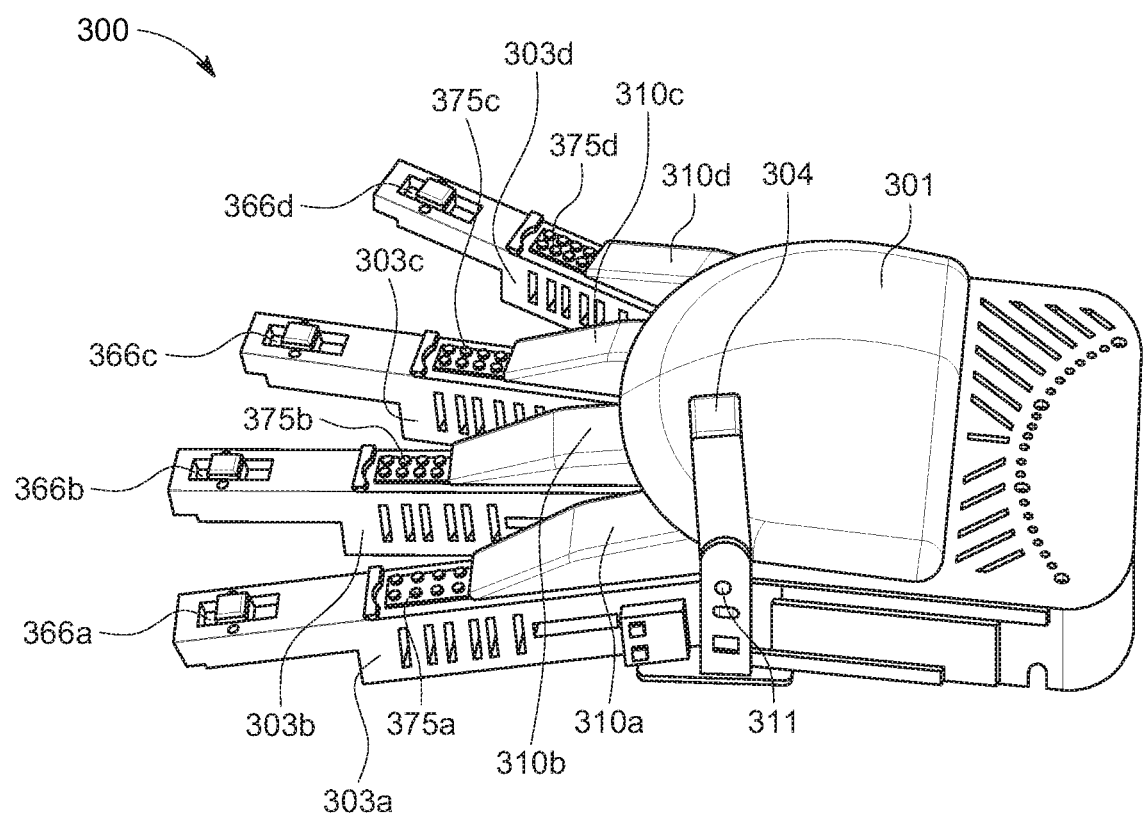
FIG. 9 is another perspective view of the mouse in accordance with an embodiment of the present disclosure, with each finger-rest spaced apart from each other.

FIG. 7 is a perspective view of a finger-rest 303 of the plurality of finger-rests 303a-d of the mouse 300, in accordance with an embodiment of the present disclosure. FIG. 8 is a perspective view of the finger-rest 303 of FIG. 7, with a mechanical joint 305, i.e., a hinge, a link, a knuckle joint, a slidable connector, a tie rod, or the like, in a flexed orientation. FIG. 9 is another perspective view of the mouse 300 in accordance with an embodiment of the present disclosure, with each finger-rest 303a-d spaced apart from each other.

Each finger-rest of the plurality of finger-rests 303a-d is hingedly connected to the baseplate 302 via a respective mechanical joint 305. As shown in FIG. 7, opposite ends of the mechanical joint 305 connect to a first end of a rod 307 and to an end of a finger-rest 303. A latch 309 may lock a second end of the rod 307 in the shaft 306, providing a slidable attachment to the baseplate 302. If all rods 307 and at least one mechanical joint 305, e.g., connected to the finger-rest for the user's little finger, are locked, only one indicator 366 can be used on each finger-rest 303. If two indicators 366 can be used, each rod 307 and each mechanical joint 305 can be unlocked. In this case, the mechanical joint 305, shaft 306 and rod 307 provide a maximal degree of adjustability and freedom of movement for the user's fingers allowing the user to spread and to bend his or her fingers during the mouse operation keeping fingertips on haptic elements 375.

Accordingly, a palm-rest is provided on a first side of the computer mouse, with a baseplate provided on a second side that is substantially opposite the first side. A plurality of mechanical joints are positioned along one edge of the palm-rest and a plurality of finger-rests are provided. Each finger-rest of the plurality of finger-rests is configured to attach to one end of a respective mechanical joint of the plurality of mechanical joints. In response to operation of one mechanical joint of the plurality of mechanical joints, a distal end of a finger-rest of the plurality of finger-rests corresponding to the one mechanical joint will move, without moving distal ends of the finger-rest of the plurality of finger-rests. In response to operation of one mechanical joint of the plurality of mechanical joints, the distal end of the finger-rest corresponding to the one mechanical joint will be spaced apart from or positioned near a distal end of an adjacent finger-rest. The installation of a position sensor on a movable finger-rest of the index finger, which is usually the most precise of the fingers, allows users to increase the mouse accuracy.

The stick 304 may serve as a reference point to measure a size of the users' hand and fingers, for proper fit of the mouse 300 to unique hand and finger sizes. Slidable adjustment of latches 309 along respective rods 307 allows the fit to be varied and the user to spread only one or a plurality of fingers during operation.

A plurality of haptic modules are provided. Each haptic module has at least one haptic element 375 for providing haptic feedback to a respective finger rest of the plurality of finger-rests 303a-d. When the mouse 300 is in use, haptic elements 375 are positioned beneath respective distal phalanges of the user's fingers, as shown in FIG. 4. Tactile feedback may be provided to a user in response to one or more detected positions of a respective indicator of a plurality of indicators 366a-d relative to displayed elements corresponding to the detected positions.

Data related to pixels of a displayed GUI data is extracted, GUI elements are identified among the extracted data, descriptions of the extracted data are identified and stored, coordinates of corresponding pixels are mapped and are identified based on coordinates of respective indicators of the plurality of indicators 366a-d within a working area of the mouse 300.

Audible signals may be output to identify GUI elements at positions corresponding to one or more of the positions of the user's fingertips. An amplitude of the audible signal may be inversely proportional to the distance between a GUI element and a positions of one or more of the user's fingertips when operating the mouse 300.

Haptic feedback is provided based on characteristics of corresponding GUI elements or displayed pixels. The haptic feedback may include output of Braille symbols.

When operating the mouse 300, the user may slide his/her fingers across the working area until a virtual keyboard home row position is detected. The user may then control finger positions using symbols output via haptic elements 375*a-d*. The user may limit hand and finger movements to find a only specific key or home key, and maintain finger position close to a base position, according to a selected touch-type technique.

Each haptic module may convert an electrical signal into a mechanical stimulus (e.g., a vibration or motion) or electrical stimulus which may be recognized by a user via tactile sensation, e.g., by output of Braille symbols corresponding to displayed symbols. According to an embodiment, the haptic module may include, for example, a motor, a piezoelectric element or electric stimulator. Arrangement of the haptic elements 375*a-d* on respective distal phalanx positions allows for use of a relatively small number of haptic elements compared to conventional pin-matrix haptic displays.

As shown in FIGS. 3-6 and 9, a plurality of indicators 366*a-d* are provided with an indicator being provided on each distal end of each finger rest 303.

Each indicator of the plurality of indicators 366*a-d* may be an infrared light emitting diode (LED) of similar device that may be tracked for position, e.g., by an infrared camera, to obtain position as well as relative orientation of each finger-rest 303*a-d*. The obtained position and orientation of each finger-rest 303*a-d* may be provided to a system that provides improved navigation of webpages and similar electronically displayed media.

The distal end of each finger rest 303 extends beyond the respective distal phalanx when the mouse is operated with a camera overhead above the mouse 300. Each indicator of the plurality of indicators 366*a-d* may face upwards, as shown, to facilitate tracking by a camera 496 (FIG. 11) of a computer 490, e.g., a webcam or infrared camera, of absolute positions thereof, using a laser scanner, e.g., a two-mirror-two-axis raster scan system, photodetector system, etc. When the mouse 300 operates on a transparent surface, the plurality of indicators may be positioned on an underside of each finger rest 303. In each embodiment, mouse 300 operates without using a conventional trackball or similar mechanical sensor or position identifier, and/or conventional optical position identifier or tracking device used to a transform relative movement of the mouse on the computer screen.

The position of each distal end of each finger rest 303 corresponds to a position of each respective fingertip, which a user will readily recognize via kinesthetic sense. As described herein, the position of distal end of each finger rest 303 is mapped to corresponding position(s) of displayed pixel(s), and haptic feedback is provided in response to detected positions of each fingertip and the mapped pixel positions.

Operation of mechanical joints 305*a-d* allows distal ends of each finger-rest of the plurality of finger-rests 303*a-d* to be spaced apart from each other, as illustrated in FIG. 9, thereby allowing the user to receive haptic feedback from up to four elements of GUI and expediting navigation thereof, particularly useful to for effective navigation and text entry by visually impaired users.

Figure 11:
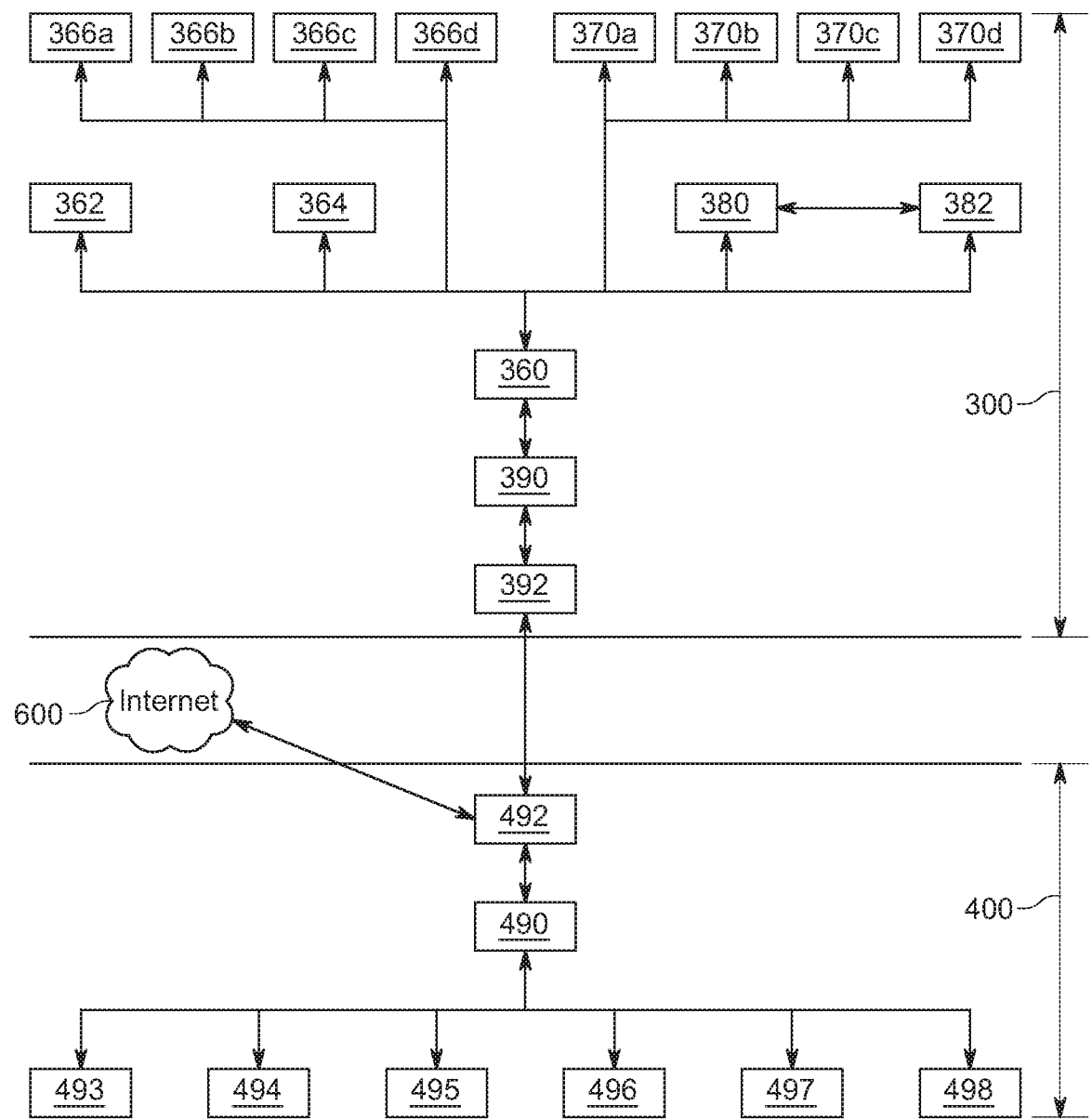
FIG. 11 illustrates a system for use of the mouse in accordance with an embodiment of the present disclosure.

FIG. 11 illustrates a system for use with the computer mouse 300 according to an embodiment of the present disclosure.

As shown in FIG. 11, the mouse 300 may, in addition to the components described above, include at least one processor 360, a memory 362, a sound output device 364, a plurality of indicators 366*a-d*, a plurality of haptic modules 370*a-d*, a battery 380, a power management module 382, a wireless communicator 390, and an antenna 392. The wireless communicator 390 and antenna 392 are configured to wirelessly communicate with a computer 400. Alternatively, the mouse 300 may communicate with the computer 400 by hard wired connection, which may eliminate the need for the battery 380, the power management module 382, the wireless communicator 390 and the antenna 392.

The computer 400 includes at least one processor 490, at least one antenna 492 configured to wirelessly communicate with the mouse 300 and the Internet 600 and/or local area network. Alternatively, or in addition, the computer 400 may communicate with the Internet 600 and/or local area network by hard wired connection. The computer 400 may include a memory 393, a display 494, a camera 496, a power supply 495, a keyboard 497 and a conventional mouse 498. The keyboard 497 and conventional mouse 498 may be hardwired to the computer 400 and are typically not active while the computer 400 communicates with the mouse 300. The memory is configured to store mapped positions of displayed GUI elements. The at least one processor 490 is configured to compare the stored mapped positions with received positions of one or more indicators of a plurality of indicators 366*a-d* detected by the camera 496, which acts as a position detector during communication with the mouse 300. The camera 496 identifies the position of each indicator of the plurality of indicators 366*a-d* of the mouse 300. The camera 496 may be a webcam that observes a working area projected on a flat surface on which the mouse 300 operates. Accordingly, a size of the working area may correspond to a field of view of the camera 496 and resolution thereof, and the working area may be a rectangular shaped corresponding to a size of the displayed data from which the user of the mouse 300 will navigate.

The at least one processor 490 may control storing by the memory 493 of data mapping coordinates of each haptic element of the plurality of haptic elements 375*a-d*, based on positions of the plurality of indicators 366*a-d*, to pixels of a displayed GUI and corresponding characteristics of the displayed GUI.

Figure 10:
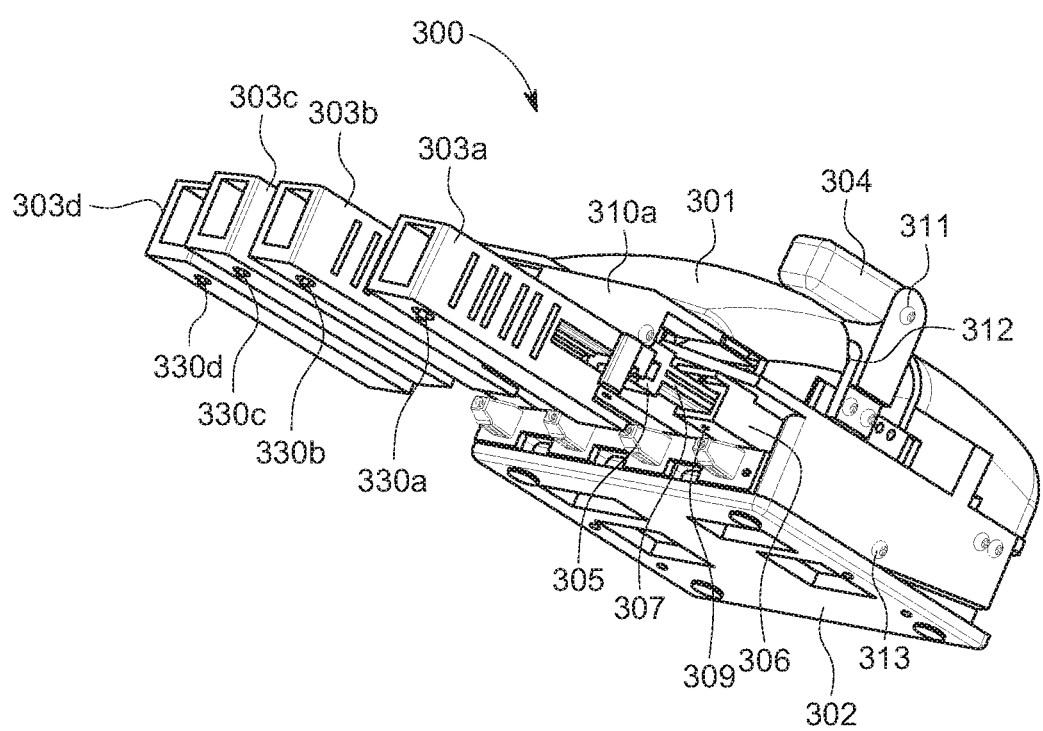
FIG. 10 is a perspective view of a mouse in accordance with an embodiment of the present disclosure.

FIG. 10 is a perspective view of a mouse in accordance with an embodiment of the present disclosure. The mouse of FIG. 10 is similar to the mouse of FIG. 3, but instead of plurality of indicators, it includes a plurality of a position sensors 330*a-d*, e.g., trackballs, provided on respective finger-rest to detect an input from a user of movement of an individual finger, independent of movement of the palm-rest 301. The installation of a position sensor on a movable and a tiny finger-rest configured for the user's index finger, which is usually the most precise of the fingers, allows users to increase the mouse accuracy. Two position sensors installed on movable finger-rests for index and ring fingers allow the user to zoom or magnify an image displayed on the computer screen by spreading these fingers apart in a certain operation mode of the mouse. Position sensors installed on the other finger-rests can be used for such operations as swiping the screen, rotating the picture, and etc.

Figure 12:
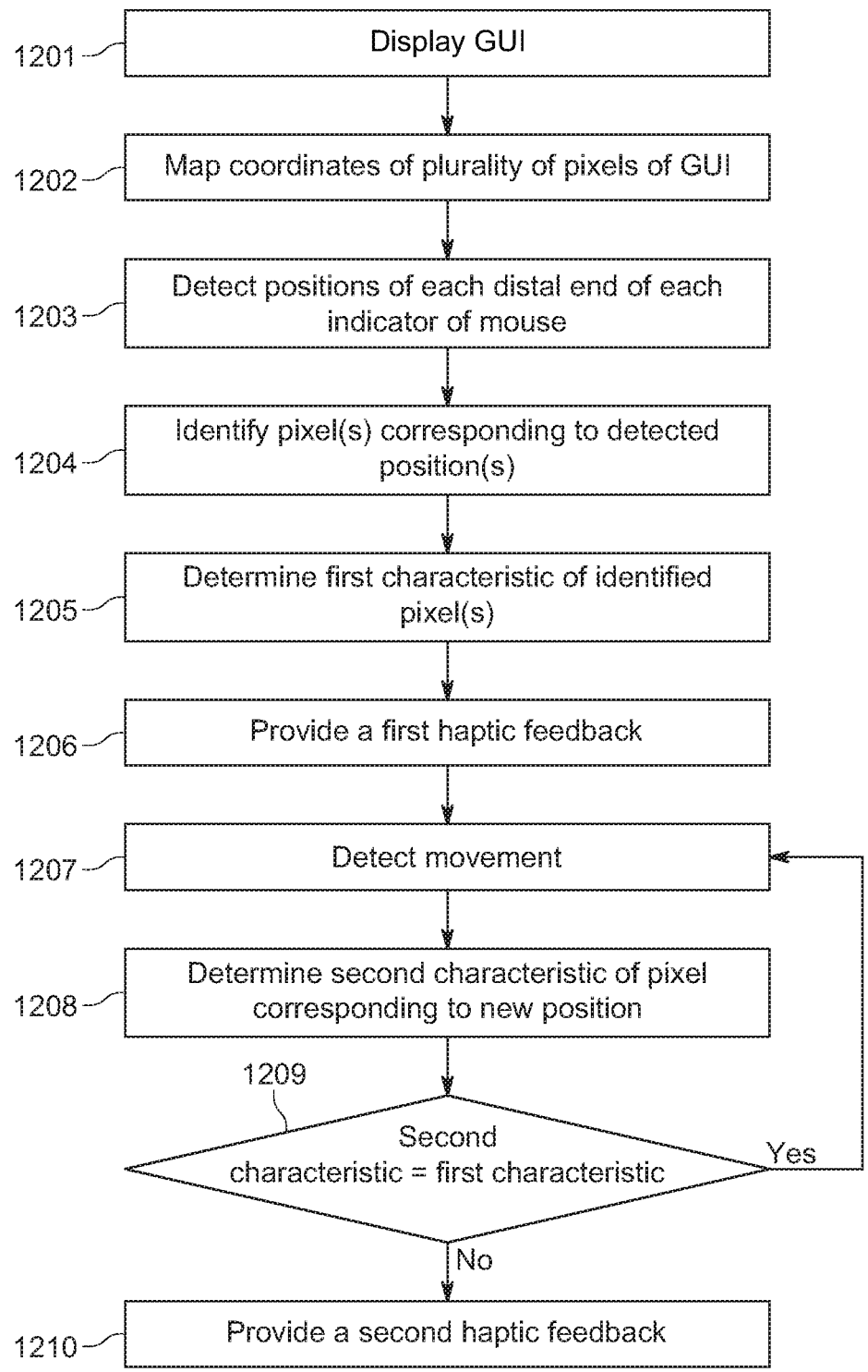
FIG. 12 illustrates a method for navigation using the mouse in accordance with an embodiment of the present disclosure.

FIG. 12 illustrates a method for navigation using the mouse 300 in accordance with an embodiment of the present disclosure.

In step 1201, the at least one processor 360 controls displaying on display 494 of a GUI that includes a plurality of pixels. In step 1202, coordinates of pixels of the plurality of displayed pixels are mapped by the at least one processor 490. The at least one processor 490 controls, in step 1203, the camera 486 to detect positions of each distal end of each indicator of the plurality of indicators. In step 1204, at least one pixel of the GUI is identified as corresponding to each detected position.

In step 1205, a first at least one characteristic is determined of each identified at least one pixel of the GUI. In step 1206, a first haptic feedback is provided in response to the determined first at least one characteristic of each identified at least one pixel. In step 1207, movement of at least one distal end of at least one indicator is detected. In step 1208, a second at least one characteristic is determined of at least one pixel corresponding to a new position of the moved at least one distal end. In step 1209, the second at least one characteristic is determined to be different from or the same as the first at least one characteristic. In step 1210, in response to the second at least one characteristic being different from the first at least one characteristic, a second haptic feedback is provided to a haptic module corresponding to the moved at least one distal end.

Figure 13:
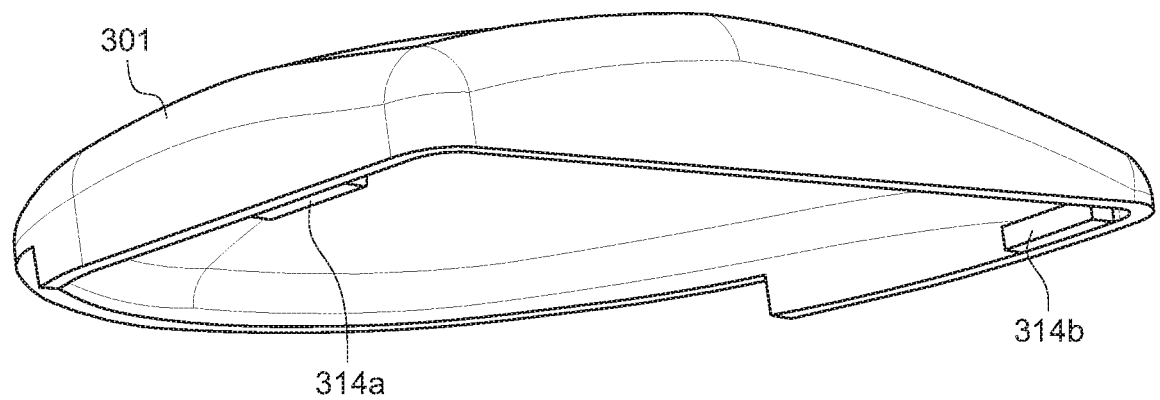
FIG. 13 illustrates guiding rails on an inner surface of the palm-rest in accordance with an embodiment of the present disclosure.

FIG. 13 illustrates guiding rails on an inner surface of the palm-rest in accordance with an embodiment of the present disclosure. As shown in FIG. 13, a shortened palm-rest 301 is provided by slidable adjustment in a longitudinal direction using guiding rails 314*a*, 314*b* located on the inside surface of the palm-rest 301.

While the present disclosure has been shown and described with reference to certain aspects thereof, it will be understood by those skilled in the art that various changes in form and details may be made therein without departing from the spirit and scope of the present disclosure, as defined by the appended claims and equivalents thereof.

What is claimed is:

1. A housing for a computer mouse, comprising:
   a palm-rest on a first side of the housing;
   at least one mechanical joint attached at a first end thereof to the palm-rest;
   a finger-rest attached to a second end of the at least one mechanical joint opposite the first end, to movably connect to the palm-rest;
   a position sensor provided on at least one finger-rest, and configured to provide a position of at least one finger-rest;
   a baseplate on a second side substantially opposite the first side;
   a peripheral finger-rest fixedly attached to the baseplate;
   a distal portion extending from the peripheral finger-rest;
   at least one spherically shaped recess; and
   at least one push-button positioned between the palm-rest and the at least one spherically shaped recess, and
   wherein the at least one spherically shaped recess is configured to accommodate a distal phalanx of a finger of the user and to receive from the user a pushing force on the distal portion to move the mouse in a desired direction.

2. The housing of claim 1,
   wherein the at least one push-button is configured to detect input from a user, such input to be converted into an electric signal.

3. The housing of claim 2, wherein the at least one spherically shaped recess is not configured to receive user input to be converted into an electric signal.

4. The housing of claim 1, further comprising:
   another position sensor provided on the second side, and configured to detect movement of the computer mouse.

5. A housing for a computer mouse, comprising:
   at least one palm-rest on a side of the housing;
   at least one mechanical joint attached at a first end thereof to the palm-rest;
   a finger-rest attached to a second end of each mechanical joint opposite the first end, to movably connect to the palm-rest; and
   a position sensor provided on at least one finger-rest, and configured to provide a position of at least one finger-rest,
   wherein the position sensor is provided on a distal end of the at least one finger-rest and the position sensor is not covered by a user's finger during use of the computer mouse.

6. The housing of claim 5, further comprising:
   at least one feedback element configured to provide feedback to the user's finger resting on the finger-rest; and
   an inclined recess configured to cover the at least one feedback element,
   wherein the inclined recess selectively covers an interactive button operable by the user's finger.

7. A computer mouse, comprising:
   a palm-rest;
   a plurality of mechanical joints, wherein an end of each mechanical joint of the plurality of mechanical joints is attached along an edge of the palm-rest;
   a plurality of latches, with each latch of the plurality of latches affixed to a respective mechanical joint of the plurality of mechanical joints;
   a plurality of rods, with each joint of the plurality of joints slidably affixed to a respective latch of the plurality of latches; and
   a plurality of finger-rests, wherein a proximal end of each finger-rest is movably connected to the edge by attachment to an other end of a respective mechanical joint of the plurality of mechanical joints,
   wherein each movably connected finger-rest is configured to slidably move the proximal end of each finger-rest in a distal direction, and
   wherein the attachment of the end of each mechanical joint of the plurality of mechanical joints along the edge of the palm-rest is provided via a respective latch of the plurality of latches.

8. The computer mouse of claim 7,
   wherein, in response to operation of at least one mechanical joint of the plurality of mechanical joints, a distal end of a respective finger-rest is one of spaced apart from and positioned near a distal end of an adjacent finger-rest.

9. The computer mouse of claim 7, further comprising:
   at least one feedback element provided on at least one finger-rest of the plurality of finger-rests.

10. The computer mouse of claim 9,
    wherein the at least one feedback element is configured to provide feedback to a finger of a user of the computer mouse resting on a respective at least one finger-rest.

11. The computer mouse of claim 10,
    wherein the feedback is one of a haptic feedback and a Braille symbol.

12. The computer mouse of claim 7, further comprising:
    at least one of an indicator and a position sensor provided on a finger-rest of the plurality of finger-rests.

13. The computer mouse of claim 12,
    wherein the at least one of the indicator and the position sensor is configured to provide at least one of a position and an orientation of a distal end of at least one finger-rest.

14. The computer mouse of claim 13,
    wherein the at least one of the position and the orientation is provided to at least one processor in communication with the computer mouse.

15. The computer mouse of claim 7, further comprising:
a stick configured to be held between a user's index finger and the thumb.

16. The computer mouse of claim 15,
wherein, in a standby state, the stick extends in a direction substantially perpendicular a surface of the palm-rest, and
wherein, in an operation state, the user inputs a varied number of different inputs by moving the stick in longitudinal and transverse directions.

17. The computer mouse of claim 7, further comprising a baseplate,
wherein the palm-rest is configured to swing around a horizontal axis, to move closer to and away from the baseplate.

18. A navigation method, comprising:
controlling, by at least one processor, output of a user interface (UI) comprising a plurality of pixels;
mapping pixels of the plurality of pixels;
detecting positions of each distal end of each indicator of a plurality of indicators of a remote input device in communication with the at least one processor;
identifying at least one pixel of the UI as corresponding to each position of the detected positions;
determining a first at least one characteristic of each identified at least one pixel of the UI;
providing a first feedback in response to the determined first at least one characteristic;
detecting movement of at least one distal end of at least one indicator;
determining a second at least one characteristic of at least one pixel corresponding to a position of the moved at least one distal end of at least one indicator; and
in response to the second at least one characteristic being different from the first at least one characteristic, providing a second feedback to the remote input device corresponding to the moved at least one distal end,
wherein the remote input device comprises:
at least one mechanical joint movably attached at a first end thereof to a base of the remote input device;
a finger-rest movably attached to a second end of each mechanical joint opposite the first end; and
a position sensor provided on at least one finger-rest, and configured to provide a position of at least one finger-rest, the position sensor being provided on a distal end of the at least one finger-rest and not being covered by a user's finger during use of the remote input device.

19. The navigation method of claim 18,
wherein the remote input device is a computer mouse.

20. The navigation method of claim 18,
wherein the first feedback and the second feedback are a haptic feedback each provided to a haptic module of the remote input device.

* * * * *